United States Patent [19]

Speedie

[11] 4,124,922
[45] Nov. 14, 1978

[54] RETAINING MEANS

[75] Inventor: Robert Speedie, Frankston, Australia

[73] Assignee: W. A. Deutsher Pty Ltd., Moorabbin, Australia

[21] Appl. No.: 800,375

[22] Filed: May 25, 1977

[30] Foreign Application Priority Data

Jun. 1, 1976 [AU] Australia .............................. PC6127

[51] Int. Cl.² ............................................. F16G 11/04
[52] U.S. Cl. .................................. 24/115 R; 24/217 R; 403/211
[58] Field of Search ............ 24/115 R, 115 K, 115 H, 24/217; 403/215, 213, 211

[56] References Cited

U.S. PATENT DOCUMENTS

| 307,806 | 11/1884 | Sailer | 24/115 R |
| 483,672 | 10/1892 | Green | 24/115 R |
| 1,064,920 | 6/1913 | Lovejoy | 403/215 |
| 2,877,527 | 3/1959 | Bond | 24/115 H |
| 3,330,586 | 7/1967 | Becker | 403/213 |

Primary Examiner—Kenneth J. Dorner
Attorney, Agent, or Firm—Jack R. Halversen; Robert W. Beart

[57] ABSTRACT

A retaining means, for use in securing a cover to a body, such as with swimming pools and trailers, including a housing member for receiving a shock cord or rope and an insert member for insertion into the housing member to retain the shock cord or rope against removal therefrom.

7 Claims, 5 Drawing Figures

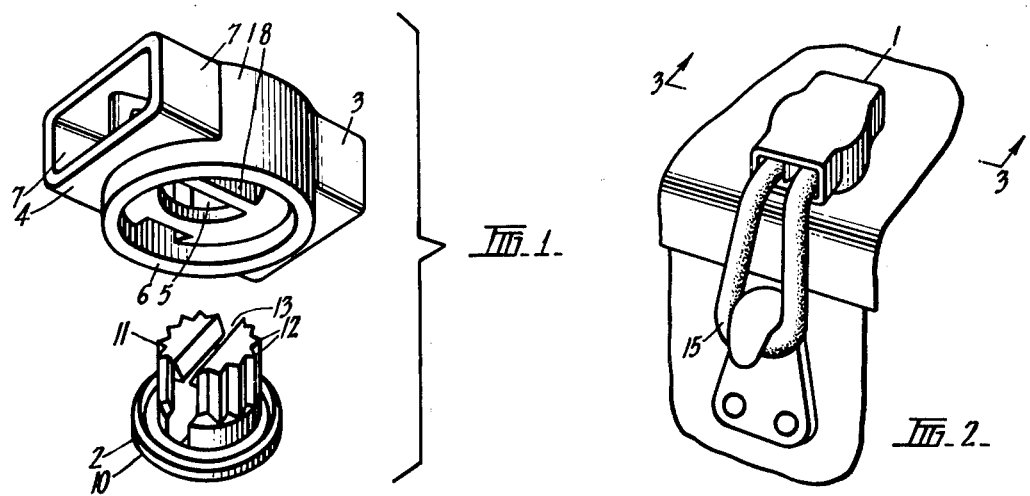
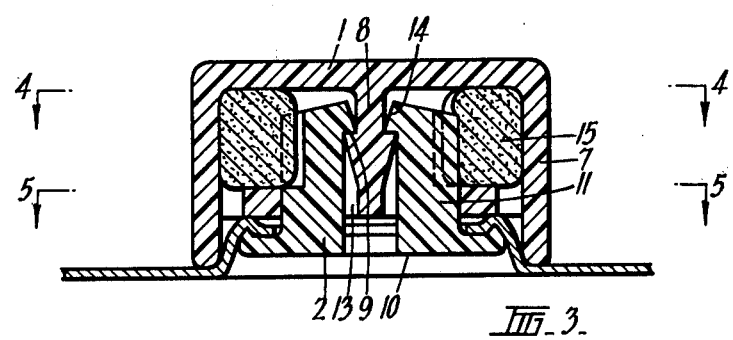
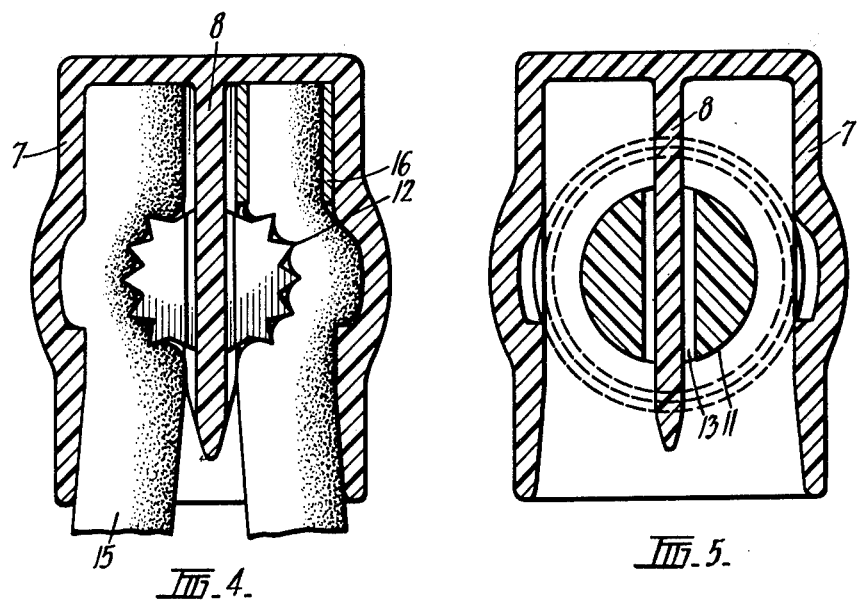

RETAINING MEANS

FIELD OF THE INVENTION

This invention relates to retaining means and refers particularly, though not exclusively, to a retaining means for retaining a cover in place relative to a body. Such retaining means are particularly userful, for example, in securing rain and protective covers to the trays of utilities, motor-boats, swimming pools etc.

The task of securing a cover, such as a tonneau cover, to a body such as a car body has long been complicated by the requirement that a shock cord, rope or the like must be threaded manually through a series of eyelets in the cover and in addition around a series of hooks on the body. Then, once such threading has taken place, the shock cord, rope or the like has to be appropriately tensioned. Such a procedure has been found in practice to be laborious, time consuming and inefficient.

As an alternative to this procedure, press-studs or the like have quite often been used. However, press-studs have been found not to allow for variations in covers and, quite often, the failure of one press-stud can lead to the progressive failure of all the remaining press-studs. Such prior art practices, and more particularly the problems associated therewith, can be very annoying to users — particularly when a cover is being applied and positioned in adverse weather conditions.

It is therefore the principal object of the present invention to provide a retaining means which is extremely simple in its principle of operation and yet is effective as regards the results of such operations, thereby seeking to overcome the problems and drawbacks associated with prior art devices.

It is a further object of the present invention to provide a retaining means which, by virtue of its simplicity of configuration, is both easily and inexpensively manufactured.

SUMMARY OF THE INVENTION

With the aforegoing and other objects in mind the present invention provides a retaining means including: a hollow main housing member and a co-operating insert member, said main housing member including a first aperture for receiving the free ends of a retaining strap or the like, and a second aperture for receiving said insert member, said main housing member and said insert member being co-operable whereby to retain said strap or the like against movement in said main housing member.

In accordance with a further aspect of the present invention there is also provided a method of retaining a cover in position on a body, utilizing a plurality of retaining means in accordance with the present invention, said method including the steps of: positioning the free ends of a plurality of retaining straps in respective housing members of said plurality of retaining means, locating said housing members adjacent apertures provided on said cover, engaging said respective housing members with their associated insert members, through said apertures in said cover, whereby to form each retaining strap into a closed loop and retain said cover relative to said housing member and insert member, and fixing said closed loops to respective hook members provided on said body.

DETAILED DESCRIPTION OF THE DRAWINGS

In order that the invention may be more clearly understood reference shall now be made to the accompanying drawings which illustrate in some detail a preferred construction of a retaining means incorporating the features of the present invention, the ensuing description being by way of non-limitative example only.

FIG. 1 shows a perspective view of the two elements making up the retaining means in accordance with the present invention, namely a housing member and an insert means;

FIG. 2 illustrates a retaining means in accordance with the present invention in its operative condition, in conjunction with a strap and hook member, retaining a cover in position;

FIG. 3 is an elevational view of the retaining means of FIG. 2 taken along the line 3—3 of FIG. 2;

FIG. 4 is a plan view taken along the line 4—4 of FIG. 3 showing the working relationship between the shock cord, the housing member and the co-operating insert means of the present invention; and FIG. 5 is a plan view taken along the line 5—5 of FIG. 3.

DETAILED DESCRIPTION OF THE ILLUSTRATED EMBODIMENT

The particular embodiment shown is relative to retaining in place a boat cover but may well be used with equal efficiency and success for retaining a place swimming pool covers, tarpaulins, tonneau covers, and the like. The particular embodiment has, in essence, two main components — a housing member 1 and a stud 2. Preferably, the stud 2 and the housing member 1 are moulded of Nylon so as to provide corrosion resistance and colourability.

The housing member 1 comprises a hollow rectangular box-like element 3 having one end face open. The box-like element 3 may be of any suitable size, but is preferably made with its length greater than its width, and with the width greater than the height. By way of example, the length may be 2.5 units, the width 1.7 units, and the height 0.9 units.

The base 4 of the housing member 1 is provided with a circular aperture 5 located approximately centrally thereof. Located around the aperture 5 is a flange 6 extending downwardly from the base 4 and of an external diameter greater than the width of the housing member 1 but less than the length thereof. The flange 6 has an internal diameter that is greater than the diameter of the aperture 5 so that the stud 2, when fitted, will not project downwardly beyond the lowermost regions of the flange 6. Again by way of exemplification, the flange 6 may have an external diameter of 20 units and an internal diameter of 17 units, whilst the aperture may have a diameter of 10 units.

The side walls 7 of the housing are preferably bulged outwardly in an arcuate manner adjacent the aperture 5 so that, when viewed from below, the side walls 7 adjacent the aperture 5 appear to be a continuation of the flange 6.

Extending downwardly from the top surface of the housing member 1 into the hollow interior and to the base 4 of the housing member 1 is an internal wall or partitioning member 8. The internal wall 8 extends almost the entire length of the housing member 1 and is such that it projects over the aperture 5. The internal wall 8 has an outstanding shoulder 9 adjacent its lowermost edge, which shoulder 9 tapers inwardly to the lowermost edge so that the internal wall 8 approximates an arrowhead in profile when viewed through the open end-face of the housing member 1 (as shown for example in FIG. 3).

The stud 2 has a round flat head 10 and a coaxial cylindrical shank 11. The head 10 is of a diameter slightly less than the internal diameter of the flange 6 of the housing member 1 for example, 15 units and the shank 11 is of a diameter such that it is a tight fit in the aperture 5 of the housing member 1. The shank 11 is also of a length approximately equal to the internal height of the housing member 1.

The region of the shank 11 remote from the head 10 is provided with a number of equally spaced longitudinally extending splines 12, the splits 12 being formed by cutting the material therebetween from the shank 11 so that the crest diameter of the shank 11 at the splines 12 is the same as the external diameter of the remainder of the shank 11.

Extending the entire length of the stud 2 is a slot 13 of preferably rectangular section, which slot 13 is arranged symmetrically around the longitudinal axis of the stud 2. At the end of the stud 2 remote from the head 10 the slot 13 has two inwardly directed diametrally opposed shoulder-like teeth 14.

To use the retaining means of the present invention, a shock cord 15 of an elastic material and of a suitable length is placed with each free end in the housing member 1 — one free end of the cord 15 being located on either side of the internal wall 8. The cord 15 enters the housing member 1 through the open front face. The shank 11 of stud 2 is then passed through a suitable hole in the cover which is to be secured and the stud 2 is pressed into the housing member 1 through the aperture 5 in the base 4 thereof. This forces the material of the cover to be retained in position relative to the stud 2 and housing member 1 due to the interaction between the head 10 of the stud 2, the external surface of the base 4 of the housing member 1 adjacent the aperture 5, and the flange 6 — the cover material being gripped through a tortuous path between the head 10 of the stud 2 and the flange 6, as shown for example in FIGS. 3 and 4.

As the shank 11 of the stud 2 enters the interior of the housing member 1 it forces the free ends of the shock cord 15 apart and into the bulged portions of the side walls 7 of the housing member. The shock cord 15 is thus retained in position due to the tortuous path created by the interaction of the bulged portion of the side walls 7 and the shank 11 of the stud 2. The splines 12 on the shank 11 of the stud 2 serve to increase the tortuous nature of the path, thereby assisting in retaining the cover against movement.

The stud 2 is retained in the housing member 1 by the inwardly facing teeth 14 in the slot 13 engaging the shoulder 9 of the internal wall 8 in a snap fit. The pressure exerted by reason of the cord 15 being pushed outwardly sideways creates a corresponding inwardly directed force on the shank 11 of the stud 2 so as to maintain the engagement of the teeth 14 with the shoulder 9 of the internal wall 8. This in turn prevents disengagement of the stud 2 and the housing member 1.

When the head 10 of the stud 2 is finally located it is below the surface of the cover, whereas the housing member 1 is above the surface of the cover. This arrangement serves to prevent abrasion of the surface of the body to which the cover is to be attached.

Once the shock cord 15 is positioned and retained in the retaining means, it could then be stretched so that it engages with a projection or hook 15 on the body whereby to retain the cover in place, as shown for example in FIG. 2.

In an alternative embodiment, the shank 11 of the stud 2 may have radially outwardly directed arms at the outermost extremity thereof and the aperture 5 in the base 4 of the housing member 1 may be elongate so that a bayonet-type fitting could be used.

In an especially preferred embodiment, as shown in FIG. 4, the free end of the shock cord 15 is provided with a metal sleeve 16, which sleeve 16 may be attached to said cord 15 by crimping. Such a sleeve 16 serves a two-fold purpose. Firstly, it acts to protect the free end(s) of the cord 15. Secondly, it assists in locking the free end(s) of the cord 15 into the housing member 1.

The retaining means in accordance with the present invention exhibits a number of advantages over the prior art. For example, the sheer simplicity of its construction and principle of operation lend themselves to the provision of a neat appearance. In addition, and as suggested earlier, since the retaining means of the present invention does not protrude from the underside of the cover employed therewith, there is little if any likelihood of marking or otherwise damaging the article or body to which the cover is to be attached.

Whilst there has been described in the foregoing description a preferred construction of a retaining means according to the present invention, it will be understood by those skilled in the art that many modifications or variations in details of design or construction may be made without departing from the essential nature of the invention as ascertained from the foregoing description.

We claim:

1. A retaining means including a hollow generally rectangular box-like main housing, a cooperating insert member and a retaining strap, said housing including a top, a base, and side wall members and at least one first end wall, an opposite second end wall having a substantial portion thereof open to provide a first aperture communicating axially along the longitudinal axis of said housing with the interior of said housing, said housing being substantially oblong in cross section, said base member including a centrally disposed second aperture, a rib-like internal partitioning means integral with said top and extending axially throughout a substantial portion of the longitudinal axial extent of said housing, said partitioning means extending normally between said top and said base and overlying said second aperture to define two axially extending chambers opening through said first aperture, said retaining strap having two free ends complementary to and acceptable within said chambers by passage through said first aperture to define a closed loop externally of said main housing, said cooperating insert member including a stud having a flat head member and a co-axially disposed cylindrically shaped shank member extending therefrom, and said shank being bifurcated by a slot extending through said shank to form two segments acceptable within said second aperture and with the partitioning means acceptable within said slot whereby said stud forces the free ends of said strap against the interior surface of said side wall members to thereby capture said retaining strap against removal from said retaining means.

2. The retaining means as claimed in claim 1 wherein said shank member includes a plurality of equally spaced longitudinally extending splines.

3. The retaining means as claimed in claim 1 wherein said main housing member includes a downwardly projecting flange on the base wall thereof, said flange defining with said base wall a compartment for receiving the head of said stud when located in said second aperture.

4. A retaining means as claimed in claim 3 wherein said side wall members are bulged laterally outwardly intermediate their length to define recesses having an abrupt cavity and shoulder means therein for lockingly engaging the strap means adjacent its free end when expanded laterally by said cooperating insert member.

5. The retaining means as claimed in claim 1 wherein said insert member includes means for co-operating with said partitioning means whereby to retain said insert member against removal from said second aperture.

6. The retaining means as claimed in claim 1 wherein said partitioning means further includes shoulder means whereby to define areas of different thickness.

7. The retaining means as claimed in claim 6 wherein said slotted shank member further includes, at the end remote from said head, at least one inwardly directed shoulder-like tooth for engagement with said shoulder means on said partitioning means.

* * * * *